United States Patent
Nandagopal et al.

(10) Patent No.: US 8,238,314 B2
(45) Date of Patent: Aug. 7, 2012

(54) METHOD AND APPARATUS FOR PROVIDING A DISTRIBUTED FORWARDING PLANE FOR A MOBILITY HOME AGENT

(75) Inventors: Thyagarajan Nandagopal, Edison, NJ (US); Thomas Y. Woo, Short Hills, NJ (US)

(73) Assignee: Alcatel Lucent, Paris (FR)

( * ) Notice: Subject to any disclaimer, the term of this patent is extended or adjusted under 35 U.S.C. 154(b) by 1105 days.

(21) Appl. No.: 11/862,431

(22) Filed: Sep. 27, 2007

(65) Prior Publication Data
US 2009/0086734 A1 Apr. 2, 2009

(51) Int. Cl.
H04W 4/00 (2009.01)
G06F 15/173 (2006.01)
H04L 12/28 (2006.01)

(52) U.S. Cl. ........ 370/338; 370/328; 370/331; 370/349; 370/351; 370/398; 370/400; 455/411; 709/223; 709/224

(58) Field of Classification Search .......... 370/328–503; 455/411–465; 709/223–224
See application file for complete search history.

(56) References Cited

U.S. PATENT DOCUMENTS

| 6,160,804 | A * | 12/2000 | Ahmed et al. | 370/349 |
| 6,256,300 | B1 * | 7/2001 | Ahmed et al. | 370/331 |
| 6,345,239 | B1 * | 2/2002 | Bowman-Amuah | 703/6 |
| 6,427,132 | B1 * | 7/2002 | Bowman-Amuah | 703/22 |
| 6,434,134 | B1 * | 8/2002 | La Porta et al. | 370/338 |
| 6,496,505 | B2 * | 12/2002 | La Porta et al. | 370/392 |
| 6,611,867 | B1 * | 8/2003 | Bowman-Amuah | 709/224 |
| 6,654,359 | B1 * | 11/2003 | La Porta et al. | 370/328 |
| 6,714,987 | B1 * | 3/2004 | Amin et al. | 709/249 |
| 6,747,961 | B1 * | 6/2004 | Ahmed et al. | 370/328 |
| 6,763,007 | B1 * | 7/2004 | La Porta et al. | 370/331 |
| 6,819,925 | B2 * | 11/2004 | Garland et al. | 455/432.1 |
| 6,857,009 | B1 * | 2/2005 | Ferreria et al. | 709/219 |
| 6,947,398 | B1 * | 9/2005 | Ahmed et al. | 370/331 |
| 6,992,994 | B2 * | 1/2006 | Das et al. | 370/328 |
| 6,992,995 | B2 * | 1/2006 | Agrawal et al. | 370/328 |
| 6,996,076 | B1 * | 2/2006 | Forbes et al. | 370/310 |
| 7,085,241 | B1 * | 8/2006 | O'Neill et al. | 370/254 |

(Continued)

FOREIGN PATENT DOCUMENTS

EP 1 653 688 A1 5/2006

(Continued)

OTHER PUBLICATIONS

PCT Search Report & Written Opinion dated Jan. 15, 2009, PCT/US2008/010795, Lucent Technologies Inc., Applicant, 14 pages.

(Continued)

*Primary Examiner* — Ayaz Sheikh
*Assistant Examiner* — Venkatesh Haliyur
(74) *Attorney, Agent, or Firm* — Wall & Tong, LLP

(57) ABSTRACT

The invention includes a method and apparatus for providing a distributed forwarding plane for a mobility home agent. The invention provides a method for controlling routing of packets for a mobile node in a network comprising a network domain including a plurality of forwarding elements being controlled by a control element. A method includes computing a route from one of the forwarding elements toward the mobile node and propagating the computed route toward that one of the forwarding elements. The route is computed using location information associated with the mobile node and routing information associated with the network domain.

18 Claims, 4 Drawing Sheets

U.S. PATENT DOCUMENTS

| | | | | |
|---|---|---|---|---|
| 7,120,453 | B2* | 10/2006 | La Porta et al. | 455/458 |
| 7,130,614 | B2* | 10/2006 | Sreemanthula et al. | 455/411 |
| 7,161,929 | B1* | 1/2007 | O'Neill et al. | 370/349 |
| 7,161,942 | B2* | 1/2007 | Chen et al. | 370/392 |
| 7,177,646 | B2* | 2/2007 | O'Neill et al. | 455/450 |
| 7,184,418 | B1* | 2/2007 | Baba et al. | 370/331 |
| 7,239,618 | B1* | 7/2007 | La Porta et al. | 370/331 |
| 7,242,678 | B2* | 7/2007 | O'Neill et al. | 370/349 |
| 7,339,925 | B2* | 3/2008 | O'Neill et al. | 370/356 |
| 7,362,727 | B1* | 4/2008 | O'Neill et al. | 370/331 |
| 7,436,804 | B2* | 10/2008 | O'Neill | 370/331 |
| 7,502,361 | B2* | 3/2009 | Ahmed et al. | 370/349 |
| 7,616,615 | B2* | 11/2009 | Sueyoshi et al. | 370/338 |
| 7,715,382 | B2* | 5/2010 | Lakshman et al. | 370/389 |
| 8,072,977 | B2* | 12/2011 | Omar | 370/390 |
| 8,081,611 | B2* | 12/2011 | Berzin et al. | 370/338 |
| 2002/0057657 | A1* | 5/2002 | La Porta et al. | 370/331 |
| 2002/0075844 | A1* | 6/2002 | Hagen | 370/351 |
| 2003/0174688 | A1* | 9/2003 | Ahmed et al. | 370/349 |
| 2004/0004967 | A1* | 1/2004 | Nakatsugawa et al. | 370/400 |
| 2004/0203596 | A1* | 10/2004 | Sreemanthula et al. | 455/411 |
| 2004/0213181 | A1* | 10/2004 | Grech et al. | 370/331 |
| 2006/0092857 | A1 | 5/2006 | Ansari et al. | |
| 2006/0092935 | A1 | 5/2006 | Lakshman et al. | |
| 2006/0092940 | A1 | 5/2006 | Ansari et al. | |
| 2006/0092974 | A1 | 5/2006 | Lakshman et al. | |
| 2006/0092975 | A1 | 5/2006 | Ansari et al. | |
| 2006/0092976 | A1 | 5/2006 | Lakshman et al. | |
| 2006/0198345 | A1* | 9/2006 | Chen | 370/338 |
| 2007/0053334 | A1* | 3/2007 | Sueyoshi et al. | 370/338 |
| 2007/0076608 | A1* | 4/2007 | Samuel et al. | 370/230 |
| 2007/0100981 | A1* | 5/2007 | Adamczyk et al. | 709/223 |
| 2007/0156866 | A1* | 7/2007 | Magnusson et al. | 709/223 |
| 2008/0031194 | A1* | 2/2008 | Yaqub | 370/331 |
| 2008/0256220 | A1* | 10/2008 | Bachmann et al. | 709/222 |
| 2009/0022115 | A1* | 1/2009 | Berzin et al. | 370/338 |
| 2009/0086734 | A1* | 4/2009 | Nandagopal et al. | 370/392 |
| 2009/0089793 | A1* | 4/2009 | Nandagopal et al. | 718/105 |
| 2010/0246394 | A1* | 9/2010 | Omar | 370/230.1 |
| 2011/0149873 | A1* | 6/2011 | Yao et al. | 370/328 |

FOREIGN PATENT DOCUMENTS

| | | |
|---|---|---|
| EP | 1 971 085 A1 | 9/2008 |
| JP | 2002-64544 | 2/2002 |
| WO | WO 2007/073654 A1 | 7/2007 |

OTHER PUBLICATIONS

No H Ohnishi Y Takagi NTT Corporation IETF S: "Mobile IP Border Gateway (MBG) <draft-ohnishi-mobileip-mbg-01.txt>; draft-ohnishi-mobileip-mbg-01.txt" Tandard-Working Draft, Internet Engineering Task Force, IETF, CH, No. 1, Oct. 1, 2002, XP015004668 ISSN: 0000-0004 paragraphs [001], [002], [03.1], [3.5.2], [3.6.4], [03.7].

Valadi R et al: "Agent-based route optimization for mobile IP" VTC Fall 2001. IEEE 54$^{TH}$. Vehicular Technology Conference. Proceedings. Atlantic City, NJ Oct. 7-11, 2001; [IEEE Vehicular Technology Conference], New York, NY: IEEE, US., vol. 1 of 4, Oct. 7, 2001, pp. 2731-2735, XP010562472 ISBN: 978-0-7803-7005-0 Paragraph [0002].

Yang Intel Corp R Dantu Univ of North Texas T Anderson Intel Corp R Gopal Nokia L: "Forwarding and Control Element Separation (ForCES) Framework; rfc3746.txt" IETF Standard, Internet Engineering Task Force, IETF, CH, Apr. 1, 2004, XP015009526 ISSN: 0000-0003 paragraphs [01.2], [0002], [0003].

RFC 3024, "Reverse Tunneling for Mobile IP, revisited", C. Montenegro, Ed., Sun Microsystems, Inc., Jan. 2001, http://www.ietf.org/rfc/rfc3024.txt.

RFC 3344, "IP Mobility Support for IPv4," C. Perkins, Ed., Nokia Research Center, Aug. 2002, http://www.ietf.org/rfc/rfc3344.txt.

Dec. 5, 2011 Office Action in Japanese Patent Application 2010-526898, Alcatel-Lucent USA Inc., Application, 3 pages.

\* cited by examiner

METHOD AND APPARATUS FOR PROVIDING A DISTRIBUTED FORWARDING PLANE FOR A MOBILITY HOME AGENT

FIELD OF THE INVENTION

The invention relates to the field of communication networks and, more specifically, to packet routing in mobile networks.

BACKGROUND OF THE INVENTION

A packet-based network employing a mobility management protocol, e.g., Mobile IP, allows mobile node users to move between networks while maintaining a permanent IP address, thereby enabling mobile node users to maintain transport layer connections, and higher-layer connections, even as mobile node users change their point-of-connection to the packet-based network. Thus, a mobile network employing a mobility management protocol such as Mobile IP enables a mobile node (MN) to maintain transport and higher-layer connections with one or more host devices available on the mobile network. For a packet-based network employing Mobile IP, mobility management for mobile node users is provided using Home Agents (HAs), Foreign Agents (FAs), and other mobility management capabilities.

In existing networks employing Mobile IP, packets originating from a host device (HD) that are intended for a MN are routed to an HA of the MN, and the HA tunnels the packets to the intended MN directly, or indirectly using an FA of the MN. Disadvantageously, since packets sent from the host to the MN are required to traverse the HA, the route taken by the packets from the host to the MN is typically not optimal (i.e., there is typically a better route between the host and the MN; however, the HA is not part of the better route and, thus, the better route cannot be used). Furthermore, where reverse forwarding via the HA is dictated by policy or choice, and is used to send packets from the MN to the host (as opposed to direct forwarding from the FA to the host), the route taken by the packets from the MN to the host is also typically not optimal (since packets sent in the reverse direction will also be required to traverse the HA).

SUMMARY OF THE INVENTION

Various deficiencies in the prior art are addressed through the invention of a method and apparatus for providing a distributed forwarding plane for a mobility home agent. The invention provides a method for controlling routing of packets for a mobile node in a network comprising a network domain where the network domain includes a plurality of forwarding elements and a control element. A method includes computing a route from one of the forwarding elements toward the mobile node and propagating the computed route toward that one of the forwarding elements. The route is computed using location information associated with the mobile node and routing information associated with the network domain.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention provides a distributed forwarding plane for a mobility home agent. The present invention distributes the packet forwarding functions of a mobility home agent across a network domain having multiple packet forwarding elements that are controlled by a separate control element, thereby obviating the requirement of existing mobility networks that packets exchanged between a mobile node and a host device traverse a specific node which acts as the mobility home agent. By obviating the need for packets exchanged between a mobile node and a host device traverse the mobility home agent, packets may be exchanged between mobile nodes and host devices using more efficient routes (e.g., routes that are optimized in terms of one or more quality-of-service metrics).

Figure 1:
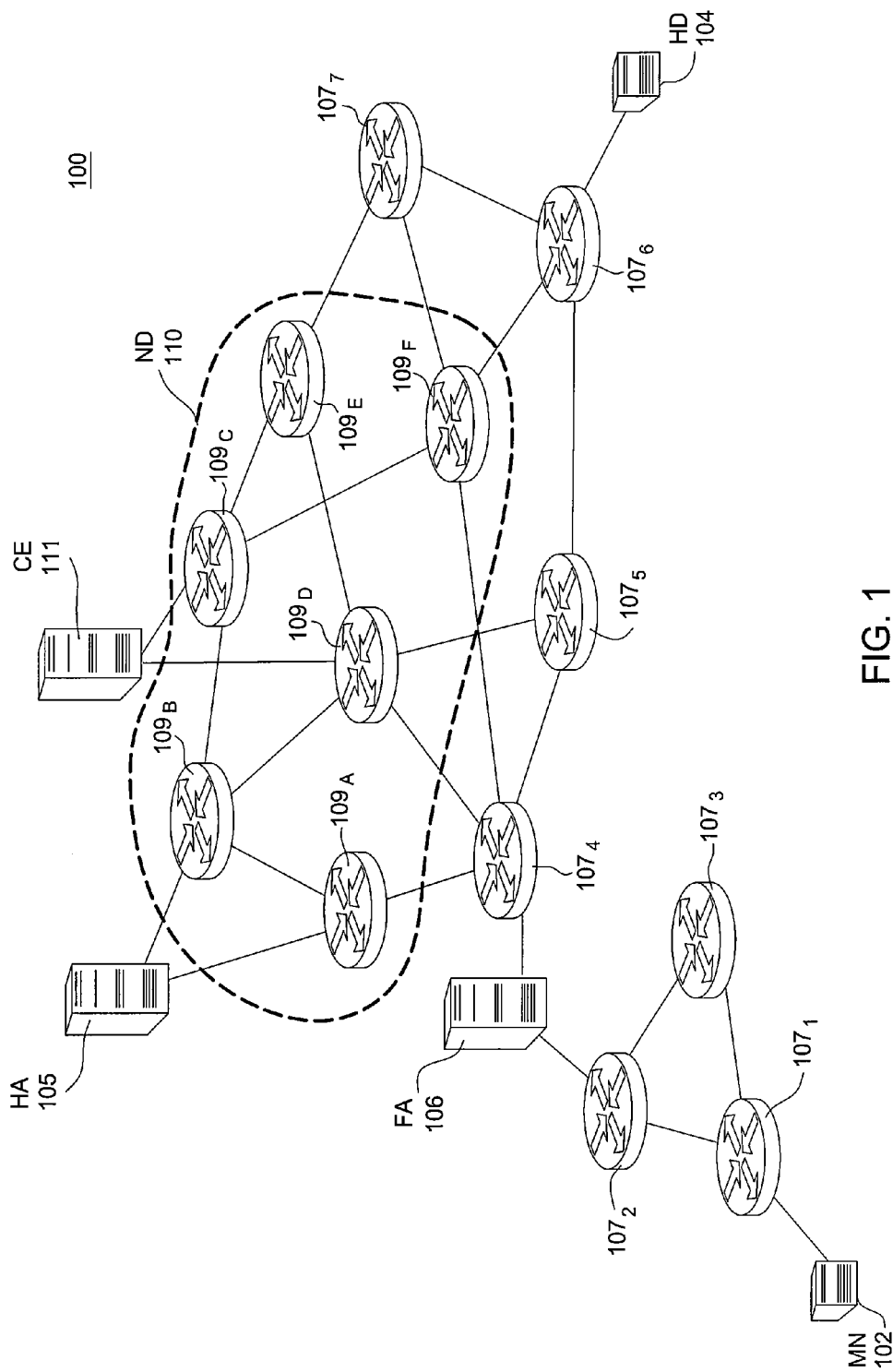
FIG. 1 depicts a high-level block diagram of a communication network.

FIG. 1 depicts a high-level block diagram of a communication network supporting mobility using a mobility management protocol. Specifically, communication network 100 includes a mobile node (MN) 102 and a host device (HD) 104 in communication using a Home Agent (HA) 105, a plurality of routing elements (REs) $107_1$-$106_6$ (collectively, REs 107), and a plurality of packet forwarding elements (PFEs) $109_A$-$109_F$ (collectively, PFEs 109). The PFEs 109 form a network domain (ND) 110 controlled by a control element (CE) 111. The MN 102 may communicate via a Foreign Agent (FA) 106. As depicted in FIG. 1, components of communication network 100 communicate using a plurality of communication links (CLs) 115.

The MN 102 includes any mobile user device capable of changing its point of attachment with communication network 100. For example, MN 102 may include any mobile wireline or wireless device, such as a laptop, mobile phone, PDA, and the like. The HD 104 includes any network device capable of communicating with MN 102. For example, HD 104 may be an application server, content server, and the like.

The REs 107 and PFEs 109 collectively cooperate to propagate packets between MN 102 and HD 104. The REs 107 include any packet routing/forwarding elements, such as routers, switches, PFEs (which may belong to ND 132 and/or one or more other NDs), and the like, as well as various combinations thereof. The PFEs 109 include packet forwarding elements adapted to route/forward packets based on routing/forwarding information (e.g., respective routing/forwarding tables) provided by CE 111.

The HA 105 operates as a Mobile IP Home Agent. The HA 105 serves MN 102 (as well as other MNs which may associate with communication network 100, which are omitted for purposes of clarity). Specifically, when MN 102 joins the network, MN 102 associates with HA 105 and HA 102 optionally provides a home address for MN 102 if MN 102 does not already posses a home address. The HA 105 knows the current location of MN 102 (including whether or not MN 102 is associated with a FA, which is the case as depicted in FIG. 1). The HA 105 is associated with ND 110, as well as other REs 107 of communication network 100.

The HA 105 functions as a router. In existing communication networks, HA 105 would receive packets from host devices and tunnel the received packets to intended mobile nodes. In communication network 100, HA 105 does not necessarily receive packets from HD 104 and tunnel the received packets to MN 102; rather, since PFEs 109 of ND 110 are adapted to perform more efficient (or even optimal) routing of packets between HD 104 and MN 102, packets from HD 104 intended for MN 102 may or may not traverse HA 105 (depending on whether or not HA 105 is in the improved path between HD 104 and MN 102).

The HA 105 determines and stores location information for MN 102. The HA 105 determines the current location of MN 102 via signaling from MN 102 (and, optionally, FA 106) when MN 102. The HA 105 then determines a route to the current location of MN 102 (i.e., a tunnel for propagating packets from HA 105 to MN 102). The HA 105 determines the tunnel endpoints of the tunnel used by HA 105 to propagate packets to MN 102. The HA 105 is one endpoint, and the other endpoint is the MN 102 or, optionally, FA 106. The HA 105 then stores: (a) the current location of MN 102 and (b) the route to the current location of MN 102 (which may be represented as tunnel endpoints). The HA 105 provides this information to CE 111 for use by CE 111 in computing an optimal route to MN 102 for each of PFEs 109 of ND 110.

The FA 106 operates as a Mobile IP Foreign Agent. The FA 106 serves MN 102 (as well as other MNs which may associate with communication network 100 via FA 106, which are omitted for purposes of clarity). The FA 106 functions as a router. The FA 106 stores information about mobile nodes that visit its network (illustratively, MN 102 which is served by FA 106). The FA 106 is depicted as an optional element because mobile nodes may associate directly with a home agent (illustratively, HA 105) or may associated with one or more foreign agents (illustratively, FA 106) as mobile nodes move between networks.

As depicted in FIG. 1, CE 111 and ND 110 function together to form a disaggregated router (i.e., the control functions of CE 111 coupled with the forwarding functions ND 110 operate together to perform full router functionality). Thus, from the perspective of each of the other devices of communication network 100, PFEs 109 of ND 110 are transparent. In other words, from the perspective of other devices in communication network 100, ND 110 appears to function as a single router even though it is composed of multiple disaggregated PFEs.

The CE 111 includes packet control functions of a typical router. The ND 110 (namely, each of the PFEs 109) includes packet forwarding functions of a typical router. The CE 111 controls installation of appropriate packet routing/forwarding behavior in PFEs 109. The CE 111 and PFEs 109 may communicate using any protocol adapted for supporting communications between components of a disaggregated router (e.g., the ForCES protocol, one or more Interior Gateway Protocols (IGPs), one or more Border Gateway Protocols (BGPs), and the like, as well as various combinations thereof).

The CE 111 is adapted to compute an optimal route for MN 102 from each PFE 109 of ND 110 controlled by CE 111. The optimal route for MN 102 from one of PFEs 109 of ND 110 is the optimal route toward MN 102 from the perspective of that PFE 109. The CE 111 is adapted to propagate the optimal route computed for MN 102 from one of the PFEs 109 of ND 110 to that PFE 109 to be stored in a routing/forwarding table (e.g., as a route entry or a forwarding entry) of that PFE 109 for use by that PFE 109 in routing packets received at that PFE 109 that are intended for MN 102.

For example, for MN 102 and PFE $109_F$ of ND 110, the optimal route for routing packets received at PFE $109_F$ that are intended for MN 102 may indicate that the next hop for packets intended for MN 102 is RE $107_4$. Thus, by installing this optimal route on PFE $109_F$, CE 111 ensures that packets received at PFE $109_F$ that are intended for MN 102 will be routed to RE $107_4$ (rather than being routed to PFE $109_D$ and PFE $109_A$ for delivery to HA 105 so that HA 105 can tunnel the packets to MN 102). It should be noted that packets received at RE $107_4$ from PFE $109_F$ will still appear to RE $107_4$ to be coming from HA 105. This example is depicted and described with respect to FIG. 2.

The CE 111 computes a route to MN 102 for each of the PFEs 109 of ND 110. The CE 111 computes the route to MN 102 for each of the PFEs 109 using location information associated with MN 102 that is available from HA 105 and network domain routing information associated with ND 110 that is available at CE 111. As described herein, the computed routes are at least improved routes (with respect to routes of existing networks that would be required to include HA 105), and may be optimal routes from the PFEs to MN 102. A method for computing an route to an MN for each PFE of a ND controlled by a CE is depicted and described with respect to FIG. 3.

The CE 111 and HA 105 may be implemented as separate network elements or as one network element (illustratively, element 120). In an embodiment in which CE 111 and HA 105 are implemented as separate network elements, HA 105 provides location information associated with MN 102 to CE 111 using network communication (e.g., using any means for communication between network elements). In an embodiment in which CE 111 and HA 105 are implemented as one network element, HA 105 provides location information associated with MN 102 to CE 111 using internal messaging (e.g., using any means for communication within a network element).

Although depicted and described with respect to specific numbers and configurations of HAs 105, FAs 106, REs 107, PFEs 109, NDs 110, CEs 111, and CLs 115, the present invention is not limited to such numbers and/or configurations of HAs 105, FAs 106, REs 107, PFEs 109, NDs 110, CEs 111, and CLs 115. Furthermore, although depicted and described with respect to a single MN and a single HD (for purpose of clarity), the present invention may be used to provide a distributed forwarding plane for a mobility home agent for any combination of mobile nodes and host devices.

Figure 2:
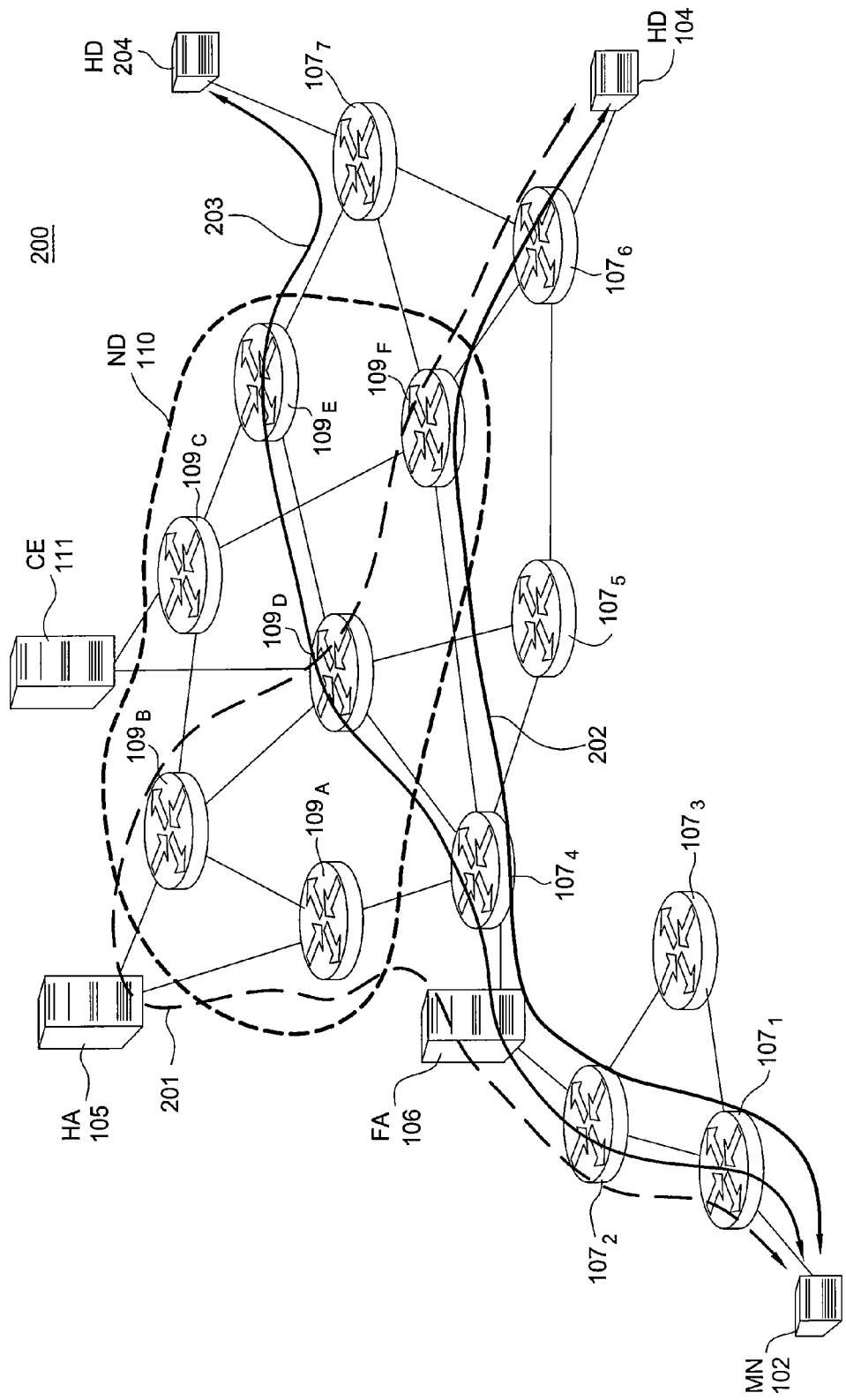
FIG. 2 depicts a high-level block diagram of the communication network of FIG. 1 illustrating exemplary routing paths for describing the present invention.

FIG. 2 depicts a high-level block diagram of the communication network of FIG. 1 including a routing path for an implementation not utilizing the present invention and a routing path for an implementation utilizing the present invention. A first routing path 201 from HD 104 to MN 102, which represents an exemplary routing path which may be traversed by packets where optimal routing of the present invention is not implemented, traverses RE $109_6$, PFE $109_F$, PFE $109_D$, PFE $109_B$, HA 105, PFE $109_A$, RE $109_4$, FA 106, RE $109_3$, and RE $109_1$. A second routing path 202 from HD 104 to MN 102, which represents an exemplary routing path which may be traversed by packets where optimal routing of the present invention is implemented, traverses RE $109_6$, PFE $109_F$, RE $109_4$, FA 106, RE $109_3$, and RE $109_1$.

From FIG. 2 it can be seen that the present invention enables packets transmitted from HD 104 to MN 102 to be routed toward MN 102 at an earlier point within ND 110 (illustratively, at the first PFE $109_F$ reached by the packets in ND 110), thereby resulting in second routing path 202. Further, even though such a diversion is created in order to optimize the routing path between HD 104 and MN 102 (in the sense that the packets exchanged between HD 104 and MN 102 are no longer required to traverse HA 105), from the perspective of MN 102 (as well as FA 106, when present) it will appear as if packets are arriving at MN 102 from HA 105 because HA 105 is associated with ND 110 and ND 110 appears to MN 102 (and FA 106) as a single RE/PFE.

From FIG. 2 is can be seen that the actual route taken by packets toward MN 102 may be different for different HDs (illustratively, the second routing path 202 may be different than a third routing path 203 which may be taken by packets originating from a second HD 204). For example, the third routing path 203 may traverse RE 109$_7$, PFE 109$_E$, PFE 109$_D$, RE 109$_4$, FA 106, RE 109$_3$, and RE 109, (thereby bypassing HA 105 and at least one other PFE 109 of ND 110). Thus, even though the routing paths taken by packets from different HDs to reach MN 102 may be different (because packets exchanged between HDs and MN 102 are no longer required to traverse HA 105), it will appear as if packets from different HDs are arriving at MN 102 from a single RE/PFE because it will appear as if packets are arriving at MN 102 from HA 105 (because HA 105 is associated with ND 110).

From FIG. 2 it can be seen that a larger ND provides greater potential for route optimization for MNs served by the HA associated with that ND. For example, as depicted in FIG. 2 the savings in the number of hops as a result of using the optimized route of the present invention is four hops (illustratively, 11 hops are required to route packets along path 202 while only 7 hops are required to route packets along path 204), where all of the savings in the number of hops in the routing path is obtained by bypassing some PFEs 109 and HA 105). Thus, for a network domain having more than six PFEs, even more savings in the number of hops in the routing path may be obtained because there is a higher probability that even more nodes will be bypassed.

Figure 3:
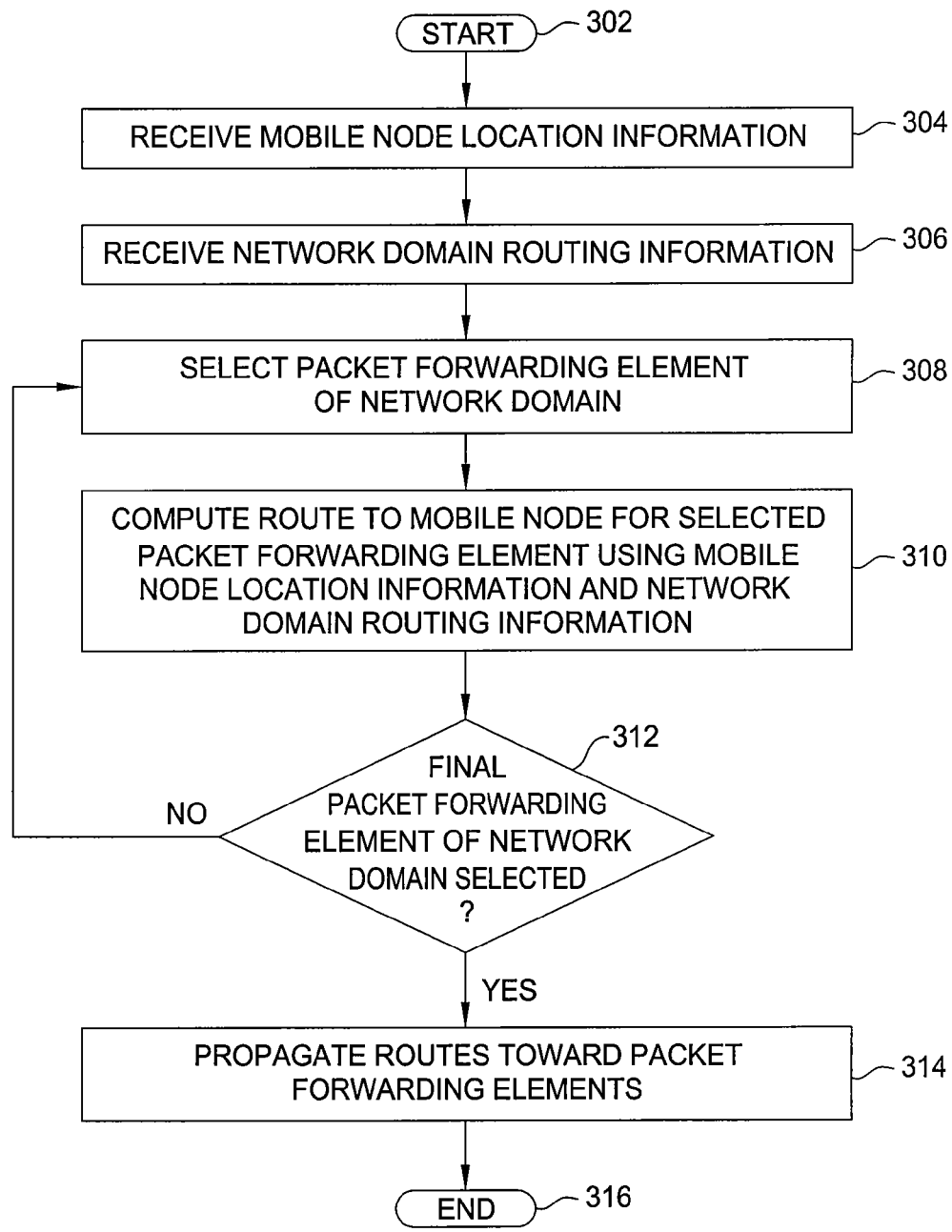
FIG. 3 depicts a method according to one embodiment of the present invention.

FIG. 3 depicts a method according to one embodiment of the present invention. Specifically, method 300 of FIG. 3 includes a method for computing, for a mobile node, a route toward that mobile node from a packet forwarding element of a network domain, and providing the computed route to the packet forwarding element for use in routing packets for the mobile node. Although depicted and described as being performed serially, at least a portion of the steps of method 300 of FIG. 3 may be performed contemporaneously, or in a different order than depicted and described with respect to FIG. 3. The method 300 begins at step 302 and proceeds to step 304.

At step 304, mobile node location information is received. The mobile node location information is received at the CE which controls the ND. For example, in a network running Mobile IP, the mobile node location information may be received from an HA (where the HA may be separate from the CE or co-located with the CE). The mobile node location information includes information indicative of the current location of a mobile node and information indicative of a route to the current location of the mobile node (e.g., endpoints of a tunnel between the HA and the MN or, optionally, a FA serving the MN).

At step 306, network domain routing information is received. The network domain routing information includes network topology information indicative of the topology of the ND and routing metrics associated with paths between each of the PFEs (of the ND controlled by the CE) and the MN. The network domain routing information may be available locally at the CE which controls the ND. In one embodiment, at least a portion of the network domain routing information is received from one or more other network elements. The routing metrics may be available from a routing table stored at the CE, which may be updated by one or more routing protocols (e.g., using IPG(s), BGP(s), and the like).

The network topology information includes any information indicative of the network topology of the ND, which enables computation of a route to the MN from the perspective of each of the PFEs of the ND. The routing metrics may include any quality-of-service metrics which may be used to evaluate paths between nodes of a network. For example, the routing metrics may include one or more of path hop metrics (e.g., in terms of the number of hops in the path), path delay metrics, link cost metrics, and the like, as well as various combinations thereof.

At step 308, one of the PFEs of the ND is selected (i.e., one of the PFEs of the ND that was not previously selected during execution of method 300). Although depicted and described with respect to an embodiment in which an optimal route to the MN is computed individually for each PFE of the ND serially, in other embodiments optimal routes to the MN may be computed for each PFE of the ND in parallel, thereby obviating the need for selection of individual PFEs for purposes of optimal route computation. In either case, the optimal route to an MN computed for a PFE is optimal from the perspective of that PFE.

At step 310, a route to the MN is computed for the selected PFE of the ND. The route to the MN is computed for the selected PFE using the mobile node location information and the network domain routing information. The computed route is an route identifying a next-hop node for packets that are received at the PFE which are intended for the MN (such that the PFE can route the packets toward the MN along an improved path that does not require the packets to be tunneled from the HA to the MN; as opposed to existing networks in which packets are always routed to the HA to be tunneled from the HA to the MN).

As described herein, the computed route is at least an improved route (i.e., an improvement over the routing path that would otherwise be used in the absence of the present invention), and the route may be an optimal route. In one embodiment, the computed route may be improved or optimized in terms of one or more routing metrics. For example, the computed route may be optimized in terms of one or more of the routing metrics available to the CE for use in computing the route (e.g., using one or more of path hop metrics, path delay metrics, link cost metrics, and like metrics, as well as various combinations thereof).

As described herein, the computed route at least identifies a next-hop node for packets that are received at the PFE which are intended for the MN. The computed route may also include other information, such as some or all of the location information associated with the MN and/or the routing information associated with the network domain. For example, the computed route may include one or more of a tunnel name, tunnel source and destination endpoints (e.g., as IP addresses), a destination interface on which packets should be propagated for that route, and the like, as well as various combinations thereof.

At step 312, a determination is made as to whether the final PFE of the ND has been selected. If the final PFE of the ND has not been selected, method 300 returns to step 308, at which point the next PFE of the ND is selected for purposes of computing a route to the MN for the selected PFE. If the final PFE of the ND has been selected, method 300 proceeds to step 314. The PFEs of the ND may be selected in any order for purposes of computing routes to the MN for the respective PFEs of the ND.

At step 314, the computed routes are propagated toward the PFEs. The computed routes may be distributed from the CE to the respective PFEs in any manner for distributing routes from a control element to packet forwarding elements. For example, the computed routes may be distributed from the CE to the respective PFEs using one or more control protocols, such as the ForCES protocol, one or more IGPs, one or more BGPs, and the like, as well as various combinations thereof.

Thus, by computing routes to the MN for each of the PFEs of the ND and propagating the computed routes to the respective PFEs, the present invention distributes the packet forwarding function typically performed by the HA across each of the PFEs of the ND associated with the HA. In other words, the present invention provides a distributed packet forwarding plane for the HA.

At step 316, method 300 ends.

Although depicted and described as ending, is it noted that each of the PFEs that receives the computed route stores the computed route for the MN for use in routing packets for that MN. The computed route (and, optionally, other information associated with the computed route) may be stored at the PFE as a route entry or a forwarding entry.

Although depicted and described as ending, method 300 is repeated for each MN associated with the network and, further, may be repeated for one or more MNs and/or one or more PFEs of the ND, as needed (e.g., periodically, in response to an event, and the like, as well as various combinations thereof).

For example, as the MN moves and changes its point of attachment with the mobile communication network, the HA provides modified mobile node location information to the CE, which will then use the modified mobile node location information and the current network domain routing information available at the CE to compute updated routes to the MN for each of the PFEs of the ND.

Although primarily depicted and described herein with respect to an embodiment in which a route is computed for each PFE of the ND before the computed routes are distributed to the respective PFEs for that MN, the routes computed for the PFEs of the ND may be distributed to the respective PFEs for that MN as the routes are computed. For example, step 314 may be performed for each PFE before step 312 is performed and the next PFE of the ND is selected.

Although primarily depicted and described with respect to computing routes and distributing the computed routes to packet forwarding elements in a network domain, in other embodiments a forwarding entry may be computed and distributed to packet forwarding elements in a network domain. In such embodiment, the information included in the forwarding entry may be different than the information described herein as being included in a route entry.

Although primarily depicted and described herein with respect to using a single quality-of-service metric (namely, based on the number of hops in the routing path between the HD and the MN) to determine optimal routes for each PFE for each MN, other quality-of-service metrics may be used, alone or in combination, to determine an optimal route to an MN for each PFE of a ND. For example, other quality-of-service metrics may include path delay metrics, link cost metrics, and the like, as well as various combinations thereof.

Although primarily depicted and described herein with respect to computing an optimal route to a mobile node for each PFE of a ND, in some embodiments a sub-optimal route (but a route that is better than the route that would be traversed by packets in existing networks) to a mobile node may be computed for each PFE of a ND. The computed route may be sub-optimal for various reasons (e.g., due to network failures, due to trying to optimize the route over multiple quality-of-service metrics, and for various other reasons).

Although primarily depicted and described herein with respect to using Mobile IP as the mobility management protocol, the present invention may be used in conjunction with other mobility management protocols. For example, the present invention may be used in conjunction with mobility management protocols such as Hierarchical Mobile IPv6 (HMIPv6), Interactive Protocol for Mobile Networking (IPMN), and the like, as well as various combinations thereof.

Figure 4:
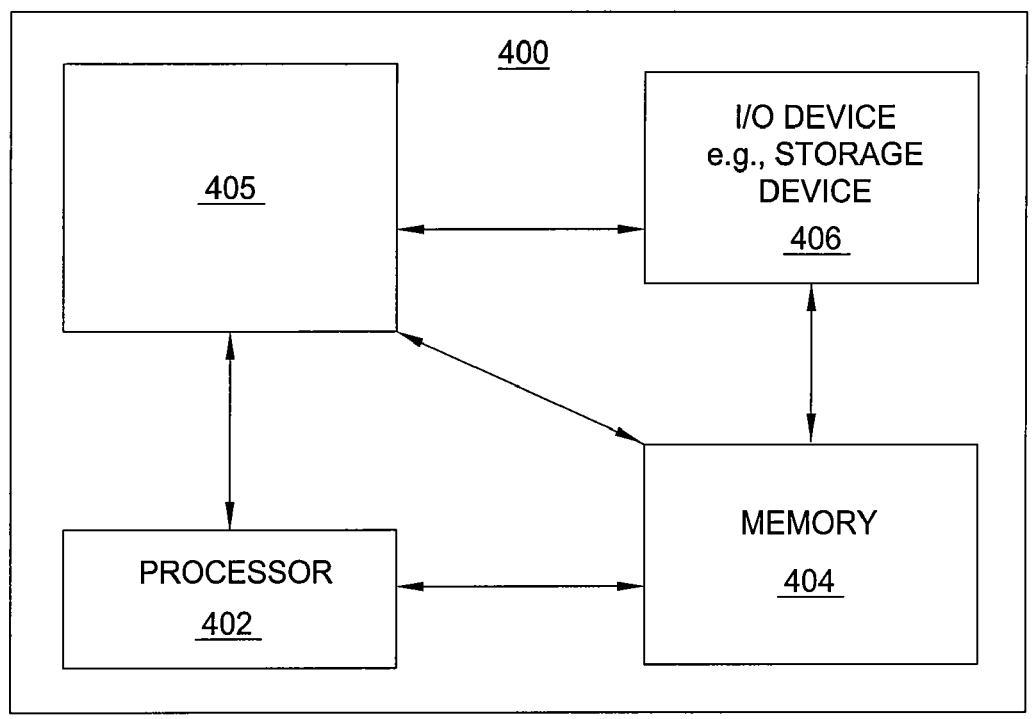
FIG. 4 depicts a high-level block diagram of a general-purpose computer suitable for use in performing the functions described herein.

FIG. 4 depicts a high-level block diagram of a general-purpose computer suitable for use in performing the functions described herein. As depicted in FIG. 4, system 400 comprises a processor element 402 (e.g., a CPU), a memory 404, e.g., random access memory (RAM) and/or read only memory (ROM), a route computation module 405, and various input/output devices 406 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present route computation process 405 can be loaded into memory 404 and executed by processor 402 to implement the functions as discussed above. As such, route computation process 405 (including associated data structures) of the present invention can be stored on a computer readable medium or carrier, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast or other signal bearing medium, and/or stored within a working memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for controlling packet routing for a mobile node in a network, the network comprising a network domain, the network domain comprising a plurality of forwarding elements configured for being controlled by a control element, the method comprising:

computing, for each of the forwarding elements, a route from the forwarding element toward the mobile node, wherein each route is computed using location information associated with the mobile node and routing information associated with the network domain;

propagating the computed routes toward the respective forwarding elements of the network domain for configuring the network domain to provide a distributed forwarding plane for a mobility Home Agent (HA);

wherein, for each forwarding element, the route is computed in a manner for obviating a requirement that a path to the mobile node include the mobility HA; and wherein, for each forwarding element, the computed route identifies a next-hop node for routing packets intended for the mobile node from the forwarding element toward the mobile node.

2. The method of claim 1, wherein the location information associated with the mobile node comprises a current location of the mobile node and a pair of endpoints of a tunnel from the mobility HA to the mobile node.

3. The method of claim 1, wherein the location information associated with the mobile node is received from the mobility HA.

4. The method of claim 1, wherein the routing information comprises network topology information associated with the network domain and at least one quality-of-service metric associated with the network domain.

5. The method of claim 4, wherein the at least one quality-of-service metric comprises at least one of a path hop metric, a path cost metric, a link cost metric, and a path delay metric.

6. The method of claim 1, wherein the forwarding elements and the control element cooperate to function as a router.

7. An apparatus for controlling packet routing for a mobile node in a network, the network comprising a network domain, the network domain comprising a plurality of forwarding elements configured for being controlled by a control element, the apparatus comprising: a processor configured to:

compute, for each of the forwarding elements, a route from the forwarding element toward the mobile node, wherein each route is computed using location information associated with the mobile node and routing information associated with the network domain;

propagate the computed routes toward the respective forwarding elements of the network domain for configuring the network domain to provide a distributed forwarding plane for a mobility Home Agent (HA);

wherein, for each forwarding element, the route is computed in a manner for obviating a requirement that a path to the mobile node include the mobility HA; and wherein, for each forwarding element, the computed route identifies a next-hop node for routing packets intended for the mobile node from the forwarding element toward the mobile node.

8. The apparatus of claim 7, wherein the location information associated with the mobile node comprises a current location of the mobile node and a pair of endpoints of a tunnel from the mobility HA to the mobile node.

9. The apparatus of claim 7, wherein the location information associated with the mobile node is received from the mobility HA.

10. The apparatus of claim 7, wherein the routing information comprises network topology information associated with the network domain and at least one quality-of-service metric associated with the network domain.

11. The apparatus of claim 10, wherein the at least one quality-of-service metric comprises at least one of a path hop metric, a path cost metric, a link cost metric, and a path delay metric.

12. The apparatus of claim 7, wherein the forwarding elements and the control element cooperate to function as a router.

13. A non-transitory computer-readable storage medium storing instructions which, when executed by a computer, cause the computer to perform a method for controlling packet routing for a mobile node in a network, the network comprising a network domain, the network domain comprising a plurality of forwarding elements configured for being controlled by a control element, the method comprising:

computing, for each of the forwarding elements, a route from the forwarding element toward the mobile node, wherein each route is computed using location information associated with the mobile node and routing information associated with the network domain;

propagating the computed routes toward the respective forwarding elements of the network domain for configuring the network domain to provide a distributed forwarding plane for a mobility Home Agent (HA);

wherein, for each forwarding element, the route is computed in a manner for obviating a requirement that a path to the mobile node include-the mobility HA; and wherein, for each forwarding element, the computed route identifies a next-hop node for routing packets intended for the mobile node from the forwarding element toward the mobile node.

14. The non-transitory computer-readable storage medium of claim 13, wherein the location information associated with the mobile node comprises a current location of the mobile node and a pair of endpoints of a tunnel from the mobility HA to the mobile node.

15. The non-transitory computer-readable storage medium of claim 13, wherein the location information associated with the mobile node is received from the mobility HA.

16. The non-transitory computer-readable storage medium of claim 13, wherein the routing information comprises network topology information associated with the network domain and at least one quality-of-service metric associated with the network domain.

17. The non-transitory computer-readable storage medium of claim 16, wherein the at least one quality-of-service metric comprises at least one of a path hop metric, a path cost metric, a link cost metric, and a path delay metric.

18. The non-transitory computer-readable storage medium of claim 13, wherein the forwarding elements and the control element cooperate to function as a router.

* * * * *